United States Patent [19]

Ebbrecht et al.

[11] Patent Number: 5,863,966
[45] Date of Patent: *Jan. 26, 1999

[54] RADIATION-CURING PRINTING INKS WITH ENHANCED SCRATCH RESISTANCE AND LUBRICITY

[75] Inventors: Thomas Ebbrecht, Witten; Georg Feldmann-Krane, Mülheim/Ruhr, both of Germany; Peter Lersch, Midlothian, Va.; Stefan Silber, Krefeld, Germany

[73] Assignee: Th. Goldschmidt AG, Essen, Germany

[ * ] Notice: The term of this patent shall not extend beyond the expiration date of Pat. No. 5,552,506.

[21] Appl. No.: 709,175

[22] Filed: Sep. 6, 1996

[30] Foreign Application Priority Data

Sep. 7, 1995 [DE] Germany .................. 193 33 062.5

[51] Int. Cl.⁶ .................................................. C09D 11/10
[52] U.S. Cl. .......................... 523/161; 524/265; 524/266; 524/267; 260/DIG. 38
[58] Field of Search .................... 523/161; 260/DIG. 38; 524/265, 266, 267

[56] References Cited

U.S. PATENT DOCUMENTS

| | | | |
|---|---|---|---|
| 5,494,979 | 2/1996 | Ebbrecht et al. | 525/479 |
| 5,552,506 | 9/1996 | Ebbrecht et al. | 528/15 |

Primary Examiner—Marion E. McCamish
Assistant Examiner—John J. Guarriello
Attorney, Agent, or Firm—Frommer Lawrance & Haug LLP

[57] ABSTRACT

Radiation-curing printing inks which comprise organopolysiloxanes of the general formula

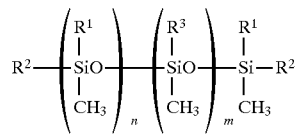

in which
$R^1$ = an alkyl radical having 1 to 8 carbon atoms,
$R^2$ = a group of the formula $$-CH_2-CH_2-C(O)O-R-(OC(O)-CH=CH_2)_{x-1}$$

and/or $$-CH=CH-C(O)O-R-(OC(O)-CH=CH_2)_{x-1}$$

in which x is an integer and is at least 2, and R is a hydrocarbon radical which optionally has alkoxy groups,
$R^3 = R^1$ or $R^2$,
n = 30 to 150,
m = 0 to 3, preferably 0,
in quantities of from 0.01 to 3% by weight, based on the ink formulation.

4 Claims, No Drawings

RADIATION-CURING PRINTING INKS WITH ENHANCED SCRATCH RESISTANCE AND LUBRICITY

FIELD OF THE INVENTION

The invention relates to radiation-curing printing inks comprising siloxanes which have acrylate groups. These printing inks possess not only good release properties but also enhanced scratch resistance and increased lubricity.

BACKGROUND OF THE INVENTION

Lack of emissions, lower investment costs and a lower energy requirement as a result of short drying units, high production rates by virtue of rapid curing, and in many cases enhanced quality of coating, especially with regard to gloss and abrasion resistance, are the reasons why, in the field of industrial coatings, radiation curing constitutes the application form which is showing the greatest expansion.

Radiation-curing printing inks are known and are described, for example, in "UV & EB curing formulation for printing inks, coatings & paints" (R. Holman, P. Oldring, London 1988).

Their properties are causally linked with the oligomers on which they are based. In this context, the majority of commercially available oligomers in radiation-curing (UV/EB) systems are based on modified acrylates. Principal binders (30 to 95 wt. % based on the ink) are oligoineric acrylic ester compounds based on the polyethers, polyesters, epoxy resins, or polyurethanes. The average molecular weights lie customarily in the range of 200 to 4000 g/mole. Through the addition (0 to 50 wt. %) of low-viscosity mono- or multifunctional monomers, as for example hexanediol acrylate, tripropyleneglicol diacrylate, trimethylolpropane triacrylate, and the like, which serve as reactive diluents, the process viscosity can be adjusted if necessary to the desired level.

The epoxy acrylates which are frequently used in particular for coatings on paper are highly regarded for their rapid curing and the chemical resistance and hardness which can be achieved. For high-grade coatings, urethane acrylates are also employed, giving rise to excellent wetting properties, chemical resistance and hardness.

By using polyether acrylates, in contrast, it is more readily possible to achieve a desired, lower processing viscosity. Admittedly, it is necessary in this case to accept losses in respect of the abovementioned properties.

The curing mechanism presents a radiation-induced free-radical polymerization. In cases of ultraviolet-curing, the polymerization is initiated through the photoreaction of one or more initiators (0–3 to 10 wt. %). Examples of such photoinitiators are acylphosphineoxide-, acetophenone- and benzophenone-derivatives as well as thioxanthone. For acceleration, amine derivatives are occasionally used as synergists. Additional formulation constituents are one or more pigment(s). The pigment content (0.1 to 30 wt. %) depends particularly on the actual pigment type. As further additives, aerating agents as well as dispersing aids are sometimes employed.

An important area of application, in addition to the wood-processing industry, comprises that of printing inks for paper, such inks being used, for example, for the printing of record sleeves, book covers, scenic and fine art postcards and high-grade catalogs. In the course of the industrial manufacture of these printed products, the handling of these articles presents difficulties. For instance, damage to the surface of the stacked units following radiation-induced curing of the ink cannot always be avoided.

In the manufacture of printed packaging materials, moreover, a rapid release action of the printing ink is desirable, so that labels or codes applied shortly after the printing operation can be removed again at a later point in time without damaging the printed image.

Attempts have already been made to improve the handling properties of newly printed articles by adding friction-reducing additives, such as oils or waxes (e.g. polyethylene waxes or polytetrafluoroethylene waxes), to the printing ink or applying them subsequently to the printed surfaces. In many cases this leads to a disruptive loss of gloss. Moreover, the subsequent application of wax to the printed product is not always satisfactory, especially since this additional step in the process raises the manufacturing costs. In addition, it is necessary to use high concentration in order to achieve an enhancement of scratch resistance. A significant release action is not obtained in this way.

As in air-drying systems or those which operate with forced drying (temperature), silicone oils, or else organically modified siloxanes, for example polyether-siloxanes, are nowadays also employed for these purposes. However, these compounds are not incorporated chemically into the film in the course of the radiation-induced crosslinking reaction, and as a result these additives, owing to their incompatibility, rise to the surface over time, and the silicone can, on the one hand, for example in the case of repeated printing processes, reach places where it has a disruptive effect, and, on the other hand, the effect of enhanced scratch resistance is at best temporary. In particular, in the course of stacking operations it is not possible completely to avoid the transfer of the silicone additive to the reverse side of the overlying printed product.

Moreover, in the packaging industry it must be ensured that the addition of additive provides the printed product with a release effect in as short a time as possible, so that adhesive labels or codes which are applied can be removed subsequently without damaging the printed product.

In practice there is therefore a need for crosslinkable, modified silicone additives which, in low concentrations, enhance the handling properties of printed articles, especially those printed in runs, these additives in particular enhancing the scratch resistance of the fresh surfaces, increasing their lubricity, exhibiting a high release action very rapidly after crosslinking and, owing to their crosslinking, remaining in stationary form in the film. Such additives should at the same time be substantially independent of the nature and composition of the printed ink to which they are added to enhance the abovementioned properties and should be capable of universal application. These additives should be effective in minimal quantities arid should not impair the performance properties of the printing ink. In particular, they should not adversely affect the development of the surface film and the curing of the printing ink. They must, furthermore, have no deleterious effect on the stability of the printing ink and must not impair the leveling properties.

BRIEF SUMMARY OF THE INVENTION

The invention, then, is based on the object of finding compounds which meet these abovementioned requirements and are effective in a low added quantity.

This object is achieved in accordance with the invention by radiation-curing printing inks which comprise at least one organopolysiloxane of the general formula (1)

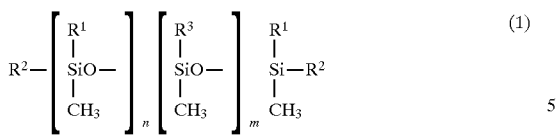 (1)

in which each $R^1$ group is independently an alkyl radical having 1 to 8 carbon atoms;

each $R^2$ group is independently a group of the formula

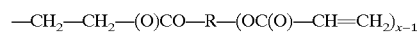

and/or

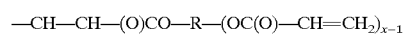

in which x is an integer and is at least 2 up to 15 and R is a branched or linear hydrocarbon radical containing 2 to 25 carbon atoms which optionally comprises alkoxy groups;

$R^3$ is an $R^1$ group or an $R^2$ group;

n=30 to 150, m=0 to 3, in quantities of from 0.01 to 3% by weight, based on the total ink formulation.

DETAILED DESCRIPTION OF THE INVENTION

The preparation of siloxanes of formula (1) is described in DE-A-43 31 608. The are obtained by direct addition of polyacrylates of the general formula

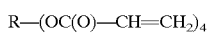

with the corresponding hydridosiloxanes with 1.2-addition or dehydrogenating 1,2-addition, rhodium catalysts being employed. $R^1$ is preferably a methyl radical. However, $R^1$ can also have the meaning of an alkyl radical having up to 8 carbon atoms. The alkyl radicals having 3 to 8 carbon atoms can be branched, although the straight-chain alkyl radicals are preferred. Examples of suitable organic acrylates are (EO=—$C_2H_4O$—):

a) Diacrylates

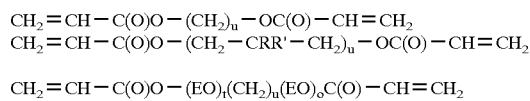

| | |
|---|---|
| | Alkyldiol diacrylate |
| | Branched alkyldiol diacrylate |
| | Ethoxylated Alkyldiol diacrylate |

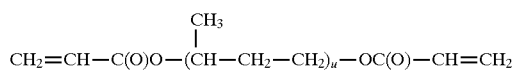

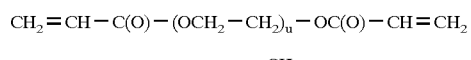

| | (Poly)-ethylene glycol diacrylate |
| | (Poly)-propylene glycol diacrylate |

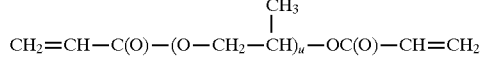

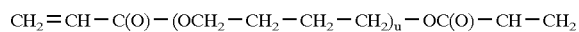

| | (Poly)-butylene glycol diacrylate |
| | Substituted bisphenol A derivative | b) Triacrylates

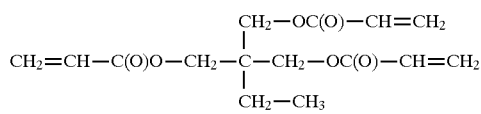

Trimethylol-propane triacrylate (TMPTA)

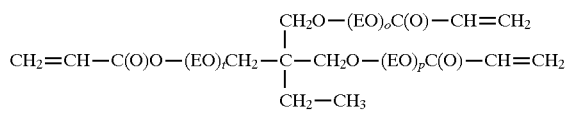

Ethoxylated trimethylol propane triacrylate

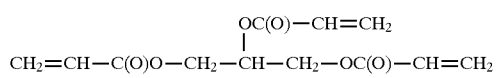

Glycerol triacrylate

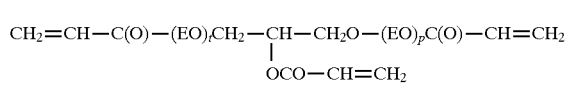

Ethoxylated glycerol triacrylate c) Tetraacrylates

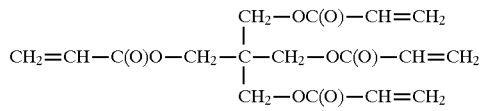    Pentaerythritol tetraacrylate

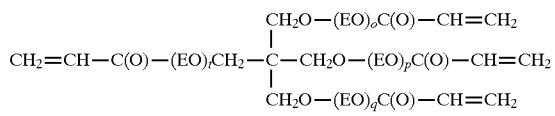    Ethoxylated pentaerythritol tetraacrylate d) Multifunctional acrylates

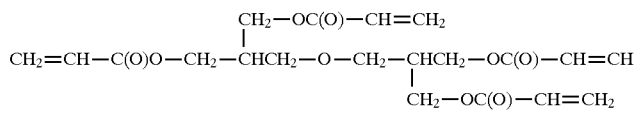    Di (trimethylolpropane) tetraacrylate

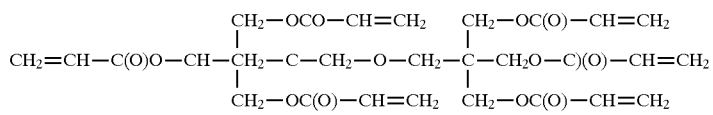    Di (pentaerythritrol) hexaacrylate

In the foregoing formulas the values of t, u and o are each independently 1 to 40.

Preferably, as compounds containing acrylate groups, acrylic esters of dihydric to hexahydric aliphatic straight-chain or branched alcohols are added on to the SiH group of the organopolysiloxane.

As compounds containing acrylate groups, 1,6-hexanediol acrylate, neopentylglycol diacrylate, tetraethylene glycol diacrylate, polypropylene glycol diacrylate, tetraethylene glycol diacrylate, glycerol triacrylate, trimethylolpropane triacrylate or pentaerythritol tetraacrylate are particularly preferably added on to the organopolysiloxane.

As rhodium catalysts, use is preferably made of catalysts which are selected from the group $RhX_3 \cdot yH_2O$, $RhX_3 (SR^5{}_3)_{,3}$, $RhX(R^5{}_3P)_3$, $RhX(CO)(R^5{}_3P)_3$, $RhH(R^5{}_3P)_4$, $RhR^4{}_3$, $Rh(CO)_2R^4$, and $[RhX(olefin)]_2$, where X is a halogen radical, preferably the chlorine radical, $R^5$ is an alkyl radical having 1 to 20 carbon atoms, an alkenyl radical having 2 to 20 carbon atoms or the radical $R^3{}_3SiQ$ (Q=dihydric aliphatic radical having 1 to 6 carbon atoms), $R^4$ is the 2,4-pentanedionato radical, olefin is alkenyl or cycloalkenyl such as ethylene, cyclooctadiene or norbornadiene, and y is a number from 0 to 4.

The hydrosilylation is preferably carried out in the presence of one of the following rhodium catalysts: $RhCl(Ph_3P)_3$ (Ph=phenyl), $RhCl_3 \cdot 3H_2O$, $[RhCl(ethylene)_2]_2$ or $[RhCl (cyclooctadiene)]_2$.

The numerical values of the indices n and m in formula (1) are of essential importance for the properties of the compounds. n indicates the number of methylalkylsiloxy units and determines the chain length of the polymers. In the compounds to be used in accordance with the invention, n has a numerical value of from 30 to 150. It is familiar to a person skilled in the art that the compounds are present in the form of a mixture with a distribution which is governed essentially by statistical laws. The value of n therefore represents the mean value of from 0 to 3, preferably from 0 to 2. If m=0, the compounds are linear siloxanes which carry acrylate groups terminally via a bridge group. It has been found that this structure of the polymers is of decisive importance for the realization of the effect according to the present invention.

Examples of compounds to be used in accordance with the invention are:

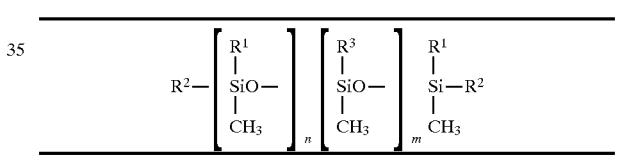

a) n = 70, m = 0, $R^1 = -CH_3$,
$R^2 = -CH_2-CH_2-C(O)O-CH_2-C(CH_2OC(O)-CH=CH_2)_3$ or
$-CH-CH-C(O)(-CH_2-C(CH_2OC(O)-CH=CH_2)_3$
b) n - 60, m = 2, $R^1 = -CH_3$, $R^3 = R^2$

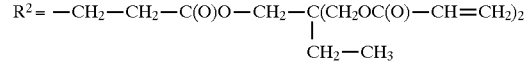

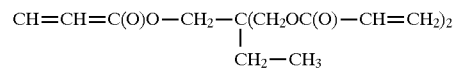

c) n = 100, m = 0, $R^1 = -CH_3$,
$R^2 = -CH_2-CH_2-C(O)(O)-CH_2-C(CH_2OC(O)-CH=CH_2)_3$ or
$-CH=CH-C(O)O-CH_2-C(CH_2OC(O)-CH=CH_2)_3$

The compounds to be used in accordance with the invention are added to the printing inks in quantities of from 0.01 to 3% by weight, based on the weight of the printing ink.

EXAMPLE 1

72.7 g (0.1 mol, 0.2 eq of SiH) of a terminally SiH functionalized polydimethylsiloxane of mean overall chain length N=8 and of the general formula $HMe_2SiO(SiMe_2O)_8SiMe_2H$ was charged with 19.2 mg (=20 ppm Rh) of chlorotris (triphenylphosphine) rhodium (I) $[RhCl(PPh_3)_3]$ and 20 mg of phenothiazine to a 250 ml four-necked flask fitted with stirrer, dropping funnel, thermometer and reflux condenser and the mixture was heated with stirring to 80° C. At this temperature, 70.4 g (0.2 mol, 0.8 eq of C=C) of pentaerythritol tetraacrylate (PETTA, Sartomer 295) was added dropwise over the course of 30 minutes. After the end of the addition, the reaction mixture was stirred further at 80° C. until, after about 5 hours, a conversion of >99% was reached. In this context the conversion was monitored by determining the SiH value every hour.

The reaction was then terminated and the catalyst residues were removed from the reaction mixture by filtration. Volatile by-products were removed by distillation under an oil-pump vacuum. The liquid reaction product had a viscosity of about 1650 mPas (25° C.) and could be described, as shown by analytical investigation using $^1H$, $^{13}C$ and $^{29}Si$ NMR, by the following formula I:

$$R^*Me_2SiO(SiMe_2O)_8SiMe_2R^* \quad \text{(Formula I)}$$

where R* is

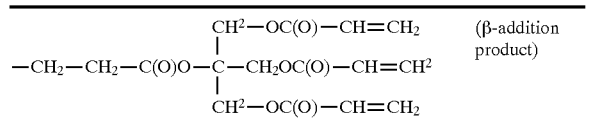 (β-addition product)

or where R* is

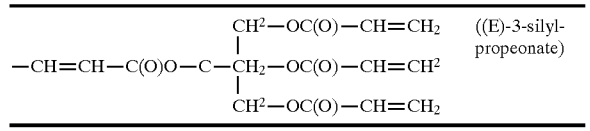 ((E)-3-silyl-propeonate)

The ratio of β-addition product ["SiC"] to ((E)-3-silypropeonate) ["SiVi"] addition product here was about 3.0:1. 14.3 g of the reaction product thus prepared (compound 6 in the AT test) (0.01 mol) was stirred with 44.5 g of decamethylcyclopentasiloxane (0.12 mol) and 0.17 g (0.3% by weight) of trifluoromethanesulfonic acid at 100° C. under a nitrogen atmosphere for 6 hours. While the reaction mixture was being cooled, 2.0 g of sodium carbonate and 0.4 g of distilled water were added and the mixture was stirred until a test for traces of acid in the mixture gave a negative result. After filtration, the volatile constituents were removed by distillation at 80° C. and 2 torr. 50.3 g (corresponding to 90% of theory) of a white, slightly cloudy product (compound 1 in the AT test) was obtained with a viscosity of 1800 mPas, which according to analytical investigation by NMR spectroscopy had a mean chain length of 70 and, in gel permeation chromatography (GPC), a uniform peak for a monomodal molecular weight distribution, and could be described by the formula $R^*Me_2SiO(SiMe_2O)_{68}SiMe_2O)_2R^*$ (Formula II),

EXAMPLE 2

In a manner analogous to that described in Example 1, further acrylate-functional siloxanes were prepared by reacting with one another, in a rhodiumcatalyzed hydrosilylation reaction, functional polydimethyl siloxane copolymers with very different chain-length distributions, either having terminal and/or lateral SiH groups, with the multifunctional acrylates pentaerythritol tetraacrylate (PETTA) or trimethylolpropane triacrylate (TMPTA). These products were subsequently equilibrated to further diverse target chain lengths, if desired with siloxane rings, and were characterized in respect of their SiC/SiVi ratio.

The text which follows shows the performance properties of various compounds to be used in accordance with the invention.

For examining the performance properties, the following printing-ink formulations were selected (quantities in % by weight):

FORMULATION 1

| PARTS | TRADENAME, MANUFACTURER | GENERIC NAME |
|---|---|---|
| 15.3 | SETACURE 567, Akzo | aromatic urethane acrylate |
| 52.6 | SETACURE 576, Akzo | aliphatic urethane acrylate |
| 10.1 | | tripropylene glycol diacrylate |
| 6.0 | HELIOGEN BLUE 7080 D, BASF | phthalocyanine pigment |
| 7.5 | QUANTACURE ITX, Ciba Geigy | 2-isopropylthioxanthon |
| 7.5 | QUANTACURE EPD, Ciba Geigy | ethyl-P-dimethylaminobenzoate |
| 1.0 | | additive according to the invention |

FORMULATION 2

| PARTS | TRADENAME, MANUFACTURER | GENERIC NAME |
|---|---|---|
| 41.2 | LAROMER LR X, BASF | amino-modified oligoether acrylate |
| 34.8 | LAROMER LR 8869, BASF | polyether acrylate |
| 4.7 | LAROMER LR 8899 X, BASF | polyester acrylate |
| 11.0 | HELIOGEN BLUE 7080D, BASF | phthalocyanine pigment |
| 3.7 | QUANTACURE ITX, Ciba Geigy | 2-isopropylthioxanthon |
| 1.8 | LUCIRIN TPO, BASF | trimethylbenzoyldiphenylphosphinoxid |
| 1.8 | ESACURE TZT | benzophenonmethylderivat |
| 1.0 | | additive according to the invention |

The printing inks were formulated in a customary manner in accordance with the above formulations. The additives of formula (1) are the last formulation constituent added in each case, the incorporation taking place by means of a bead mill disk for one minute at 2500 rpm.

The printing inks were knife-coated as a 12 Mm wet film onto corona-pretreated PVC film. Curing was effected by the action of ultraviolet light (UV) 10at 120 W/cm with web speeds of 20 m/min. This operation was repeated once in each case.

To determine the release wide adhesive tape from Beiersdorf coated with rubber adhesive and is commercially available under the designation TESA 4154. To measure the adhesivity, this adhesive tape was rolled on at 70 g/cm$^2$ for 5 minutes and, respectively, 24 hours after curing of the printing ink. After storage at room temperature for three hours, a measurement was taken of the force required to pull off the respective adhesive tape from the substrate at a rate of 12 mm/s under a peel angle of 1800. This force is designated as the release value.

Scratch resistance is the resistance of a surface to visible, linear damage by hard moving bodies which contact the surface. For the measurement of so-called scratch values, a specially converted electrically driven film drawing apparatus was used. In place of the inserted film-drawing blade, the moveable blade mounting carried a plate which lay on rollers at the other end of the apparatus. With the aid of the blade mounting, it was possible to move the plate to which the substrate (film coated with printing ink) was fastened. To simulate scratching, a wooden block with three points was placed on the film of printing ink and subjected to a load of 500 g.

The test film located on the plate was pulled away under the weight at a rate of 12 mm/s. The vertical force required for this was measured and is designated as the scratch value. The scratch values were determined in each case 24 hours after curing of the inks.

If the wooden block provided with points is replaced by a block with a flat felt lining and the procedure described above is repeated, then the frictional force measured is the so-called glide value. These tests were also carried out in each case 24 hours after curing of the inks.

The compounds 1 to 7 to be tested correspond to the general formula I. In this case, the radicals $R^1$, $R^2$, $R^3$ and the indices n and m had the meanings and, respectively, values shown in Tables 1 and 2.

TABLE 2

(Formulation 2)

| Compound | Conc. In % | $R^1$ | $R^2$ | $R^3$ | n | m | SiC/SiVi ratio | Glide value | Scratch value | Release value after 5 mins | Release value after 24 hrs |
|---|---|---|---|---|---|---|---|---|---|---|---|
| 1 | 1 | Me | PETTA | Me | 70 | 0 | 3 | 54 | 51 | 14 | 9 |
| 2 | 1 | Me | TMPTA | Me | 60 | 2 | 3 | 65 | 58 | 17 | 13 |
| 3 | 1 | Me | PETTA | Me | 100 | 0 | 3 | 49 | 43 | 10 | 9 |
| 4 | 1 | Me | PETTA | Me | 70 | 0 | 1 | 100 | 82 | 32 | 29 |
| 5 | 1 | Me | PETTA | Me | 70 | 6 | 1 | 111 | 103 | 65 | 61 |
| 6 | 1 | Me | PETTA | Me | 10 | 0 | 3 | 124 | 137 | 108 | 87 |
| 7 | 1 | Me | TMPTA | Me | 70 | 6 | 1 | 156 | 138 | 113 | 91 |
| blank | | | | | | | | 315 | 305 | tears >700 | tears >700 |

TABLE 1

(Formulation 1)

| Compound | Conc. In % | $R^1$ | $R^2$ | $R^3$ | n | m | SiC/SiVi ratio | Glide value | Scratch value | Release value after 5 mins | Release value after 24 hrs |
|---|---|---|---|---|---|---|---|---|---|---|---|
| 1 | 1 | Me | PETTA | Me | 70 | 0 | 3 | 61 | 48 | 10 | 7 |
| 2 | 1 | Me | TMPTA | Me | 60 | 2 | 3 | 68 | 55 | 13 | 9 |
| 3 | 1 | Me | PETTA | Me | 100 | 0 | 3 | 55 | 46 | 11 | 7 |
| 4 | 1 | Me | PETTA | Me | 70 | 0 | 1 | 90 | 70 | 45 | 32 |
| 5 | 1 | Me | PETTA | Me | 70 | 6 | 1 | 120 | 108 | 70 | 56 |
| 6 | 1 | Me | PETTA | Me | 10 | 0 | 3 | 130 | 125 | 140 | 95 |
| 7 | 1 | Me | TMPTA | Me | 70 | 6 | 1 | 140 | 111 | 125 | 98 |
| blank | | | | | | | | 280 | 290 | tears >700 | tears >700 |

What is claimed is:

1. In a radiation curable printing ink the improvement comprising an organopolysiloxane of the general formula

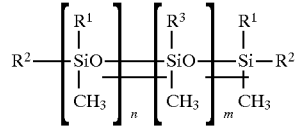

in which $R^1$ is independently in each occurrence an alkyl group having 1 to 8 carbon atoms;

$R^2$ is independently in each occurrence a group of the formula

—CH$_2$—CH$_2$—C(O)—R—(OC(O)—CH=CH$_2$)$_{x-1}$ or

—CH=CH—C(O)—R—(OC(O)—CH=CH$_2$)$_{x-1}$ in which x is an integer and is at least 2 up to 15, and R is a branched or linear hydrocarbon radical containing 2 to 25 carbon atoms which optionally comprises alkoxy groups;

$R^3$ is independently in each occurrence an $R^1$ group or an $R^2$ group;

n=30 to 150;

m=0 to 3;

in a quantity of from 0.01 to 3% by weight, based on the weight of the ink.

2. A printing ink according to claim 1, wherein the radical $R^2$ in each occurrence has the formula

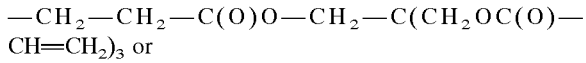

or

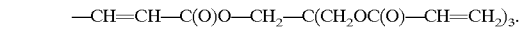

3. A printing ink according to claim 1, wherein the radical $R^2$ in each occurrence has the formula

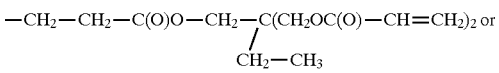

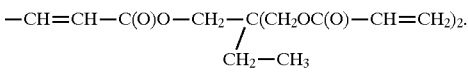

4. A printing ink according to claim 1, wherein m is zero.

* * * * *